US010466414B2

(12) United States Patent
Miyamoto et al.

(10) Patent No.: US 10,466,414 B2
(45) Date of Patent: Nov. 5, 2019

(54) GRATING, METHOD FOR MANUFACTURING GRATING, AND METHOD FOR RECYCLING GRATING

(71) Applicant: Gigaphoton Inc., Tochigi (JP)

(72) Inventors: Hirotaka Miyamoto, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 137 days.

(21) Appl. No.: 15/594,886

(22) Filed: May 15, 2017

(65) Prior Publication Data

US 2017/0248758 A1 Aug. 31, 2017

Related U.S. Application Data

(63) Continuation of application No. PCT/JP2014/083623, filed on Dec. 18, 2014.

(51) Int. Cl.

| | |
|---|---|
| ***G02B 5/18*** | (2006.01) |
| ***G02B 6/12*** | (2006.01) |
| ***B44C 1/22*** | (2006.01) |
| ***F21V 8/00*** | (2006.01) |
| ***H01S 3/1055*** | (2006.01) |
| ***H01S 3/225*** | (2006.01) |
| ***G02B 6/00*** | (2006.01) |

(Continued)

(52) U.S. Cl.

CPC ............ *G02B 6/12011* (2013.01); *G02B 5/18* (2013.01); *G02B 5/1838* (2013.01); *G02B 6/00* (2013.01); *G02B 6/0016* (2013.01); *H01S 3/1055* (2013.01); *H01S 3/225* (2013.01); *G02B 5/1847* (2013.01); *G02B 5/1861* (2013.01); *G02B 6/12* (2013.01); *G02B 26/0808* (2013.01); *G02B 26/0883* (2013.01); *G02B 2006/12197* (2013.01); *H01S 3/08004* (2013.01)

(58) Field of Classification Search

None

See application file for complete search history.

(56) References Cited

U.S. PATENT DOCUMENTS

| | | | | |
|---|---|---|---|---|
| 5,999,318 | A | 12/1999 | Morton et al. | |
| 2001/0008741 | A1* | 7/2001 | Tomita ................. | G02B 5/1857 430/271.1 |
| 2002/0001672 | A1 | 1/2002 | Pan et al. | |

(Continued)

FOREIGN PATENT DOCUMENTS

| | | | |
|---|---|---|---|
| CN | 1780727 | A | 5/2006 |
| CN | 102612668 | A | 7/2012 |

(Continued)

OTHER PUBLICATIONS

International Search Report issued in PCT/JP2014/083623; dated Mar. 24, 2015.

(Continued)

*Primary Examiner* — Shamim Ahmed

(74) *Attorney, Agent, or Firm* — Studebaker & Brackett PC

(57) ABSTRACT

A grating for line-narrowing a laser beam that is outputted from a laser apparatus at a wavelength in a vacuum ultra-violet region may include: a grating substrate; a first aluminum metal film formed above the grating substrate, the first aluminum metal film having grooves in a surface thereof; and a first protective film formed by an ALD method above the first aluminum metal film.

6 Claims, 5 Drawing Sheets

14h 23 24

22 21

23

22 21

(51) Int. Cl.

| | |
|---|---|
| *G02B 26/08* | (2006.01) |
| *H01S 3/08* | (2006.01) |

(56) References Cited

U.S. PATENT DOCUMENTS

| | | | | |
|---|---|---|---|---|
| 2002/0186741 | A1* | 12/2002 | Kleinschmidt ........ | B23K 26/12 372/57 |
| 2004/0197527 | A1 | 10/2004 | Maula et al. | |
| 2005/0030627 | A1* | 2/2005 | Kleemann ............ | G02B 5/1857 359/571 |
| 2012/0229785 | A1 | 9/2012 | Krivtsun et al. | |
| 2013/0089118 | A1* | 4/2013 | Kitamura ............. | G02B 5/1861 372/59 |
| 2013/0292700 | A1 | 11/2013 | Teramoto et al. | |

FOREIGN PATENT DOCUMENTS

| | | | |
|---|---|---|---|
| JP | H10-209533 | A | 8/1998 |
| JP | 2004-514794 | A | 5/2004 |
| JP | 2010-247417 | A | 11/2010 |
| JP | 2011-065113 | A | 3/2011 |
| JP | 2012-156245 | A | 8/2012 |

OTHER PUBLICATIONS

An Office Action mailed by the State Intellectual Property Office of the People's Republic of China dated Apr. 17, 2019, which corresponds to Chinese Patent Application No. 201480082930.4 and is related to U.S. Appl. No. 15/594,886; with English translation.

* cited by examiner

GRATING, METHOD FOR MANUFACTURING GRATING, AND METHOD FOR RECYCLING GRATING

TECHNICAL FIELD

The present disclosure relates to a grating, a method for manufacturing a grating, and a method for recycling a grating.

BACKGROUND ART

The recent miniaturization and increased levels of integration of semiconductor integrated circuits has led to a demand for increases in the resolutions of semiconductor exposure devices. A semiconductor exposure device is hereinafter referred to simply as "exposure device". Accordingly, exposure light sources to output light at shorter wavelengths have been under development. As the exposure light sources, gas laser apparatuses instead of conventional mercury lamps are typically used. The gas laser apparatuses for exposure include a KrF excimer laser apparatus that outputs an ultraviolet laser beam at a wavelength of 248 nm and an ArF excimer laser apparatus that outputs an ultraviolet laser beam at a wavelength of 193 nm.

As a current exposure technology, immersion exposure has been put into practical use. In the immersion exposure, a gap between an exposure lens and a wafer in an exposure apparatus is filled with fluid such as water to change refractive index in the gap, such that an apparent wavelength of the light from the exposure light source is shortened. In a case where immersion exposure is performed using an ArF excimer laser apparatus as an exposure light source, a wafer is irradiated with ultraviolet light whose wavelength in water is equivalent to 134 nm. This technique is referred to as "ArF immersion exposure". ArF immersion exposure is also referred to as "ArF immersion lithography".

Spectrum line widths of KrF and ArF excimer laser apparatuses in natural oscillation amplitudes are as wide as approximately 350 pm to 400 pm. This causes a chromatic aberration of a laser beam (ultraviolet light) that is subjected to reduced projection onto a wafer by a projection lens in an exposure device. The chromatic aberration thus causes reduction in resolving power. Therefore, a spectrum line width of a laser beam that is outputted from a gas laser apparatus needs to be narrowed to such an extent that the chromatic aberration can be ignored. The spectrum line width is also referred to as "spectrum width". To narrow the spectrum width, a laser resonator of a gas laser apparatus is equipped with a line narrow module having a line narrow element. The line narrow element may be an etalon, a grating, or the like. A laser apparatus whose spectrum width is narrowed in this way is referred to as "line narrowed laser apparatus".

Patent Document 1: U.S. Pat. No. 6,511,703

SUMMARY

An aspect of the present disclosure relating to a line narrowed laser apparatus may be a grating for line-narrowing a laser beam that is outputted from a laser apparatus at a wavelength in a vacuum ultraviolet region, the grating including: a grating substrate; a first aluminum metal film formed above the grating substrate, the first aluminum metal film having grooves in a surface thereof; and a first protective film formed by an ALD method above the first aluminum metal film.

Another aspect of the present disclosure may be a grating for line-narrowing a laser beam that is outputted from a laser apparatus at a wavelength in a vacuum ultraviolet region, the grating including: a grating substrate; a first aluminum metal film formed above the grating substrate, the first aluminum metal film having grooves in a surface thereof; a first protective film formed above the first aluminum metal film; a second aluminum metal film formed above the first protective film; and a second protective film formed above the second aluminum metal film.

Another aspect of the present disclosure may be a method for manufacturing a grating for line-narrowing a laser beam that is outputted from a laser apparatus at a wavelength in a vacuum ultraviolet region, the method including: forming, above a grating substrate, a first aluminum metal film having grooves in a surface thereof; and forming a first protective film by an ALD method above the first aluminum metal film.

Another aspect of the present disclosure may be a method for recycling a grating for line-narrowing a laser beam that is outputted from a laser apparatus at a wavelength in a vacuum ultraviolet region, the grating including a grating substrate, a first aluminum metal film formed above the grating substrate, the first aluminum metal film having grooves in a surface thereof, and a first protective film formed above the first aluminum metal film, the method including: forming a second aluminum metal film above the first protective film; and forming a second protective film above the second aluminum metal film.

Another aspect of the present disclosure may be a method for recycling a grating for line-narrowing a laser beam that is outputted from a laser apparatus at a wavelength in a vacuum ultraviolet region, the grating including a grating substrate, a first aluminum metal film formed above the grating substrate, the first aluminum metal film having grooves in a surface thereof, and a first protective film formed above the first aluminum metal film, the method including: etching at least a part of the first protective film; forming a second aluminum metal film above the first aluminum metal film; and forming a second protective film above the second aluminum metal film.

BRIEF DESCRIPTION OF DRAWINGS

Exemplary embodiments of the present disclosure will be described below with reference to the appended drawings.

DESCRIPTION OF EMBODIMENTS

Contents

1. Outline
2. Laser Apparatus Having Grating
2.1 Laser Chamber
2.2 Line Narrow Module
2.3 Output Coupling Mirror
3. Grating Including Protective Film Formed by ALD Method (First Embodiment)
4. Grating Including Protective Film Formed by ALD Method above Evaporated Film (Second Embodiment)
5. Grating Including Two Protective Films Formed by ALD Method (Third Embodiment)
6. Recycling of Grating (Fourth Embodiment)
7. Recycling of Grating (Fifth Embodiment)
8. Grating Having No Replicated Groove Forming Member (Sixth Embodiment)
9. Other (Film Forming Apparatus Performing ALD Method)

Embodiments of the present disclosure will be described in detail below with reference to the drawings. The embodiments described below indicate several examples of the present disclosure, and may not intend to limit the content of the present disclosure. Not all of the configurations and operations described in the embodiments are indispensable in the present disclosure. Identical reference symbols may be assigned to identical constituent elements and redundant descriptions thereof may be omitted.

1. Outline

A grating may be used as a line narrow element in a line narrowed laser apparatus. The grating may include an aluminum metal film having grooves in a surface thereof and a protective film of $MgF_2$ or the like formed above the aluminum metal film. However, prolonged exposure of the grating to a pulse laser beam having a wavelength in a vacuum ultraviolet region may cause a decrease in diffraction efficiency of the grating. For example, traces of oxygen in a housing in which the grating is placed may permeate through the protective film to oxidize the surface of the aluminum metal film.

According to an aspect of the present disclosure, the grating may include a first aluminum metal film having grooves in a surface thereof and a first protective film formed by an ALD method above the first aluminum metal film.

In the description of the grating, the term "above" may mean a position shifted in a direction from a first surface of a grating substrate toward a second surface of the grating substrate opposite to the first surface. For example, if a groove forming member is formed "above" the grating substrate, the groove forming member is not limited to a case where it is in direct contact with the second surface of the grating substrate, but a case may be encompassed where the groove forming member is formed on another layer formed on the second surface of the grating substrate.

2. Laser Apparatus Having Grating

Figure 1A:
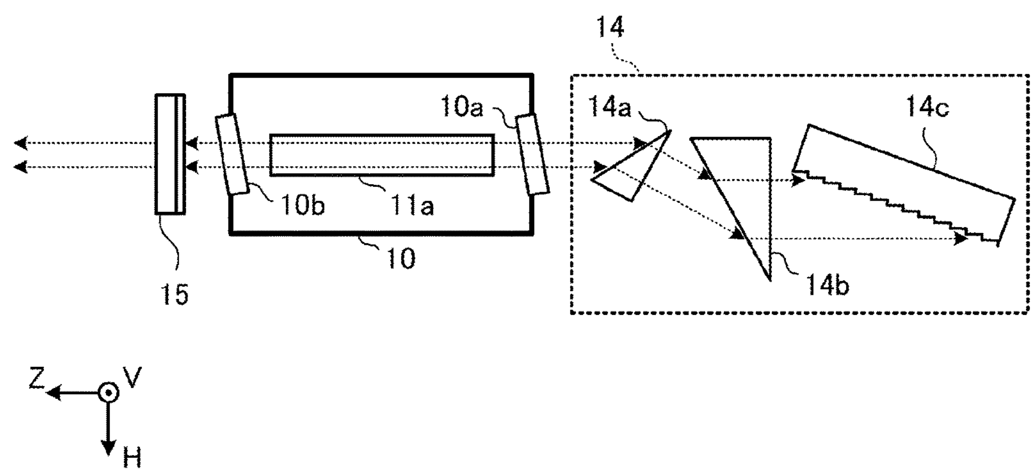
FIG. 1A schematically illustrates a configuration of a laser apparatus according to a first embodiment.
Figure 1B:
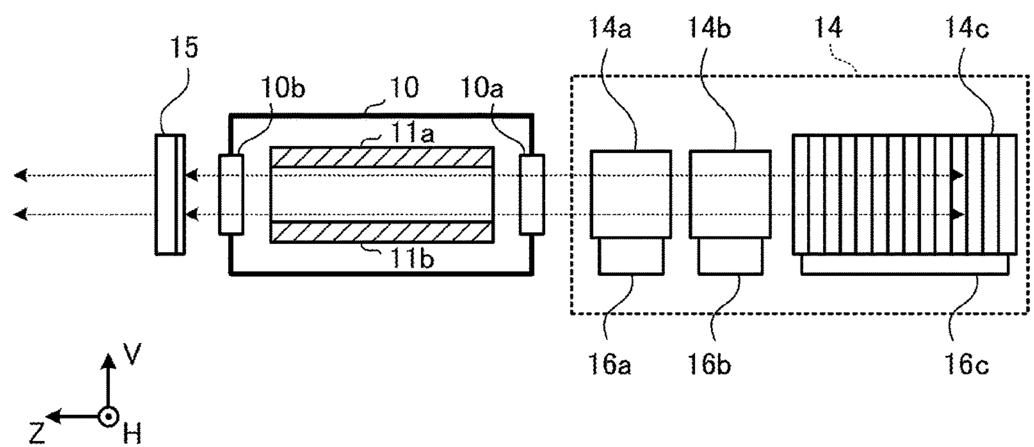
FIG. 1B schematically illustrates the configuration of the laser apparatus according to the first embodiment.

FIGS. 1A and 1B schematically illustrate a configuration of a laser apparatus according to a first embodiment. As shown in FIG. 1A, the laser apparatus may include a laser chamber 10, a pair of discharge electrodes 11*a* and 11*b*, a line narrow module 14, and an output coupling mirror 15. The laser apparatus may be a master oscillator configured to perform laser oscillation to output seed light that enters an amplifier (not illustrated).

FIG. 1A illustrates an internal structure of the laser apparatus as viewed in a direction substantially parallel to the direction of discharge between the pair of discharge electrodes 11*a* and 11*b*. FIG. 1B illustrates the internal structure of the laser apparatus as viewed in a direction substantially perpendicular to the direction of discharge between the pair of discharge electrodes 11*a* and 11*b* and substantially perpendicular to the direction of travel of a laser beam that is outputted from the output coupling mirror 15. The direction of travel of a laser beam that is outputted from the output coupling mirror 15 may be a Z direction. The direction of discharge between the pair of discharge electrodes 11*a* and 11*b* may be a V or −V direction. A direction perpendicular to both of these directions may be an H direction. The −V direction may substantially coincide with the direction of gravitational force.

2.1 Laser Chamber

The laser chamber 10 may be a chamber containing a laser gas serving as a laser medium, which contains, for example, an argon gas as a rare gas, a fluorine gas as a halogen gas, a neon gas as a buffer gas, and the like. Windows 10*a* and 10*b* may be provided at both ends of the laser chamber 10.

The pair of discharge electrodes 11*a* and 11*b* may be disposed within the laser chamber 10 as electrodes for exciting the laser medium by discharge. A pulsed high voltage may be applied to the pair of discharge electrodes 11*a* and 11*b* from a pulse power module (not illustrated).

When the high voltage is applied between the pair of discharge electrodes 11*a* and 11*b*, discharge may occur between the pair of discharge electrodes 11*a* and 11*b*. The laser medium within the laser chamber 10 may be excited by energy of the discharge and may shift to a high energy level. When the excited laser medium shifts back to a low energy level, light having a wavelength depending on the difference between the energy levels may be emitted.

As shown in FIG. 1A, the windows 10*a* and 10*b* may be disposed so that the plane of incidence of light on each window and the HZ plane substantially coincide with each other and the angle of incidence of this light is substantially a Brewster angle. The light produced within the laser chamber 10 may be emitted to the exterior of the laser chamber 10 via the windows 10*a* and 10*b*.

2.2 Line Narrow Module

The line narrow module 14 may include two prisms 14*a* and 14*b*, a grating 14*c*, and holders 16*a* to 16*c*. The prism 14*a* may be held by the holder 14*c*, the prism 14*b* may be held by the holder 16*b*, and the grating 14*c* may be held by the holder 16*c*.

The prisms 14*a* and 14*b* may expand beam width, in the H direction, of the light emitted via the window 10*a* of the laser chamber 10, and may allow that light to fall on the grating 14*c*. Further, the prisms 14*a* and 14*b* may reduce beam width, in the H direction, of light reflected from the grating 14*c*, and may allow that light to return to a discharge region in the laser chamber 10 via the window 10*a*.

The grating 14*c* may be an echelle grating having a large number of grooves formed at predetermined intervals in a surface thereof. A substance on surfaces of the grooves may be composed of a highly-reflective material. The grooves may for example be right-triangular grooves. This echelle grating may be a grating produced by replicating a master grating that has grooves formed by machining. Light falling on the grating 14*c* from the prisms 14*a* and 14*b* may be reflected by these grooves and diffracted in a direction corresponding to the wavelength of the light. The grating 14*c* may be in a Littrow mounting, so that the angle of incidence of the light falling on the grating 14*c* from the prisms 14*a* and 14*b* and the angle of diffraction of diffracted light of a desired wavelength substantially coincide with each other. This may allow light near the desired wavelength to be returned to the laser chamber 10 via the prisms 14*a* and 14*b*.

2.3 Output Coupling Mirror

The surface of the output coupling mirror 15 may be coated with a partially-reflective film. Accordingly, the output coupling mirror 15 may allow a part of the light outputted via the window 10*b* of the laser chamber 10 to pass through, thus outputting that light, and may reflect another part of the light to return the reflected light to the interior of the laser chamber 10.

The line narrow module 14 and the output coupling mirror 15 may constitute an optical resonator. The light emitted from the laser chamber 10 may travel back and forth between the line narrow module 14 and the output coupling mirror 15, and may be amplified each time it passes through the discharge region between the discharge electrodes 11*a* and 11*b*. The laser oscillation may thus be performed. The laser beam may be subjected to line-narrowing every time it is returned by the line narrow module 14. Furthermore, a polarization component in the H direction may be selected by the aforementioned disposition of the windows 10*a* and 10*b*. The laser beam thus amplified may be outputted from the output coupling mirror 15. This laser beam may have a wavelength in a vacuum ultraviolet region. The wavelength of this laser beam may be 193 nm.

3. Grating Including Protective Film Formed by ALD Method (First Embodiment)

Figure 2:
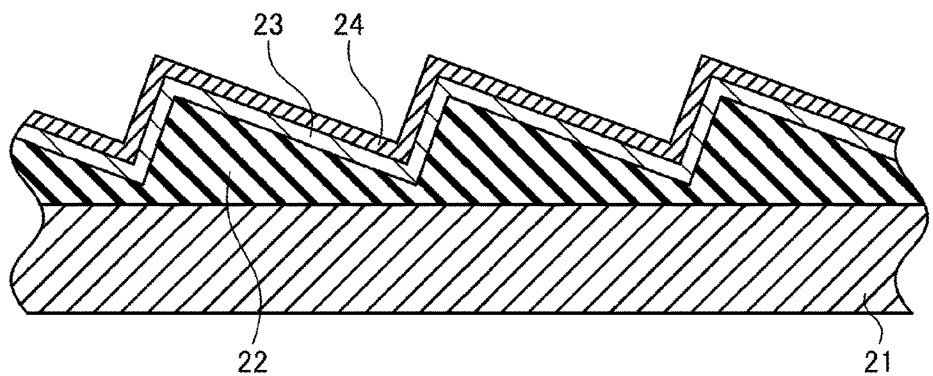
FIG. 2 is a cross-sectional view of a part of a grating according to the first embodiment of the present disclosure.

FIG. 2 is a cross-sectional view of a part of a grating according to the first embodiment of the present disclosure. A grating 14*c* according to the first embodiment may include a grating substrate 21, a groove forming member 22, a first aluminum metal film 23, and a first protective film 24.

The grating substrate 21 may be made of a material having a low coefficient of thermal expansion.

The groove forming member 22 may be formed above the grating substrate 21 by epoxy resin. The groove forming member 22 may be formed, for example, by performing groove processing on an epoxy resin layer formed above the grating substrate 21. The groove processing may be performed by replicating a master grating, thus making a replicated groove forming member.

The first aluminum metal film 23 may be formed above the groove forming member 22 by evaporation.

The first protective film 24 may be formed by an ALD (atomic layer deposition) method above the first aluminum metal film 23. The first protective film 24 may contain at least one of $MgF_2$, $SiO_2$, and $Al_2O_3$. The first protective film 24 may have such a film thickness as to be able to suppress oxygen permeation. For example, the film thickness of the first protective film 24 may be 1 nm or larger and 26 nm or smaller. Further, the first protective film 24 may have such a film thickness that causes a phase shift of $2\pi$ with a wavelength component selected by the grating. In a case where the grating selects a wavelength component of 193 nm, the film thickness of the first protective film 24 may for example be approximately 23 nm, albeit depending on the index of refraction of the first protective film 24.

The ALD method may be a film forming method including placing a substrate in a film forming vessel, adsorbing a molecular layer of a raw material compound onto the substrate, and then bringing the compound into reaction with another gas. In the ALD method, the adsorption of the molecular layer and the reaction with the gas may be repeated until a desired film thickness is achieved. For example, a $SiO_2$ film may be formed by adsorbing tetraethoxysilane onto the substrate and bringing this compound into reaction with an oxygen gas. Alternatively, an $Al_2O_3$ film may be formed by adsorbing trimethylaluminum onto the substrate and bringing this compound into reaction with an oxygen gas.

The first protective film 24 formed by the ALD method may have the following features:

(1) The shapes of grooves or asperities on the surface of the first aluminum metal film 23 may be reproduced with high accuracy on the surface of the first protective film 24.

(2) The film thickness may be substantially uniform and pin holes may be hardly formed.

(3) The desired film thickness may be achieved within an error on the order of the size of one molecular layer.

(4) An amorphous film may be formed.

(5) The film may be formed at a low temperature.

(6) A dense film may be formed by adsorbing molecular layers at layer-by-layer basis.

The grating according to the first embodiment includes the first protective film 24 formed by the ALD method. Since the first protective film 24 is dense, oxygen permeation may be suppressed. Therefore, the oxidization of the first aluminum metal film 23 may be inhibited, and the decrease in diffraction efficiency of the grating may be suppressed, so that a long life of the grating may be achieved.

4. Grating Including Protective Film Formed by ALD Method Above Evaporated Film (Second Embodiment)

Figure 3:
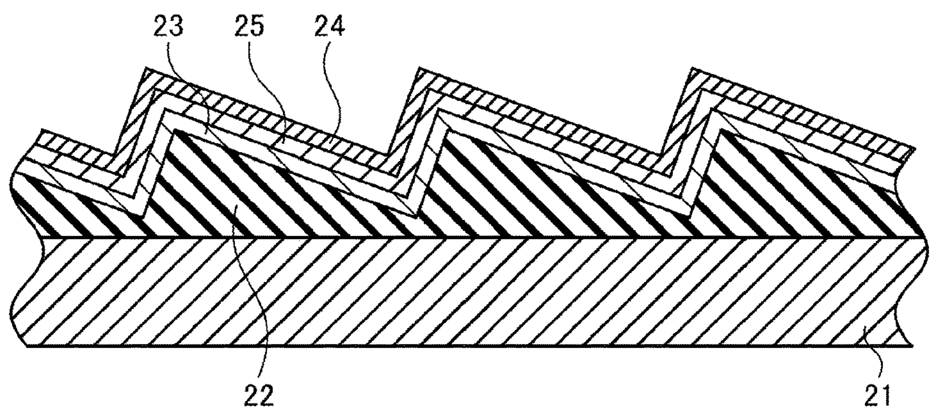
FIG. 3 is a cross-sectional view of a part of a grating according to a second embodiment of the present disclosure.

FIG. 3 is a cross-sectional view of a part of a grating according to a second embodiment of the present disclosure. A grating 14*d* according to the second embodiment may differ from that according to the first embodiment in that the grating 14*d* further includes an evaporated film 25 between the first aluminum metal film 23 and the first protective film 24.

The evaporated film 25 may contain $MgF_2$. A grating having the evaporated film 25 formed above the first aluminum metal film 23 may be one that is conventionally manufactured. According to the second embodiment, the first protective film 24 may be formed by the ALD method on the ready-made grating. This may reduce the number of steps to produce the grating.

In other respects, the second embodiment may be identical to the first embodiment.

5. Grating Including Two Protective Films Formed by ALD Method (Third Embodiment)

Figure 4:
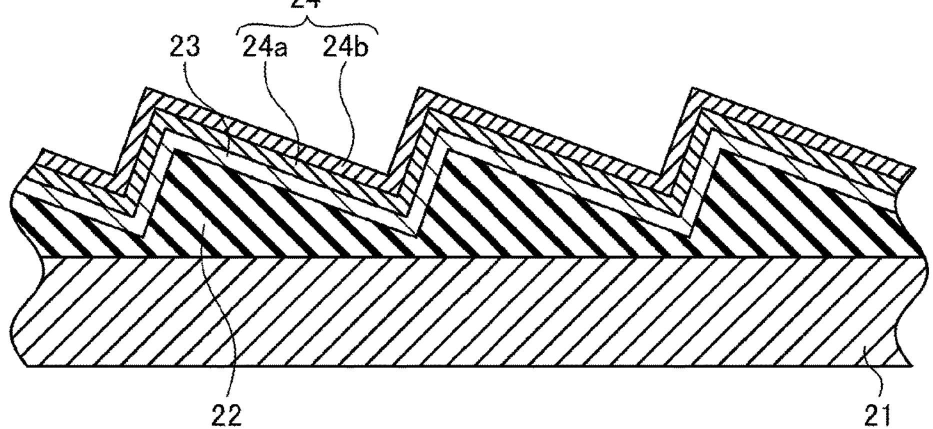
FIG. 4 is a cross-sectional view of a part of a grating according to a third embodiment of the present disclosure.

FIG. 4 is a cross-sectional view of a part of a grating according to a third embodiment of the present disclosure. A grating 14$e$ according to the third embodiment may differ from that according to the first embodiment in that the first protective film 24 formed by the ALD method includes a protective film 24$a$ and a protective film 24$b$.

The protective film 24$a$ of the first protective film 24 may be formed by the ALD method above the first aluminum metal film 23. The protective film 24$b$ of the first protective film 24 may be formed by the ALD method above the protective film 24$a$. The protective film 24$a$ and the protective film 24$b$ may constitute any of the following combinations:

(1) The protective film 24$a$ contains $SiO_2$, and the protective film 24$b$ contains $Al_2O_3$;

(2) The protective film 24$a$ contains $MgF_2$, and the protective film 24$b$ contains $Al_2O_3$;

(3) The protective film 24$a$ contains $MgF_2$, and the protective film 24$b$ contains $SiO_2$.

Each of the protective films 24$a$ and 24$b$ may have such a film thickness as to be able to suppress oxygen permeation. For example, the film thickness of each of the protective films 24$a$ and 24$b$ may be 1 nm or larger and 26 nm or smaller. Further, each of the protective films 24$a$ and 24$b$ may have such a film thickness that causes a phase shift of $2\pi$ with a wavelength component selected by the grating. In a case where the grating selects a wavelength component of 193 nm, the film thickness of each of the protective films 24$a$ and 24$b$ may for example be approximately 23 nm, albeit depending on the index of refraction of each of the protective films 24$a$ and 24$b$.

According to the third embodiment, the grating includes the protective films 24$a$ and 24$b$ formed by the ALD method. Since the protective films 24$a$ and 24$b$ are dense, oxygen permeation may be suppressed. Therefore, the oxidization of the first aluminum metal film 23 may be inhibited, and the decrease in diffraction efficiency of the grating may be suppressed, so that a long life of the grating may be achieved.

The protective films 24$a$ and 24$b$ are not limited to the ones both formed by the ALD method. Either of them may be one formed by evaporation.

6. Recycling of Grating (Fourth Embodiment)

Figure 5A:
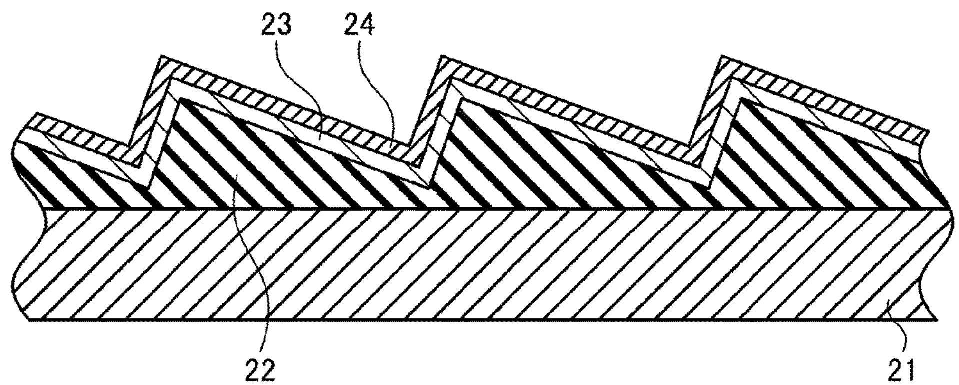
FIG. 5A is a cross-sectional view showing a step of a method for recycling a grating according to a fourth embodiment of the present disclosure.
Figure 5B:
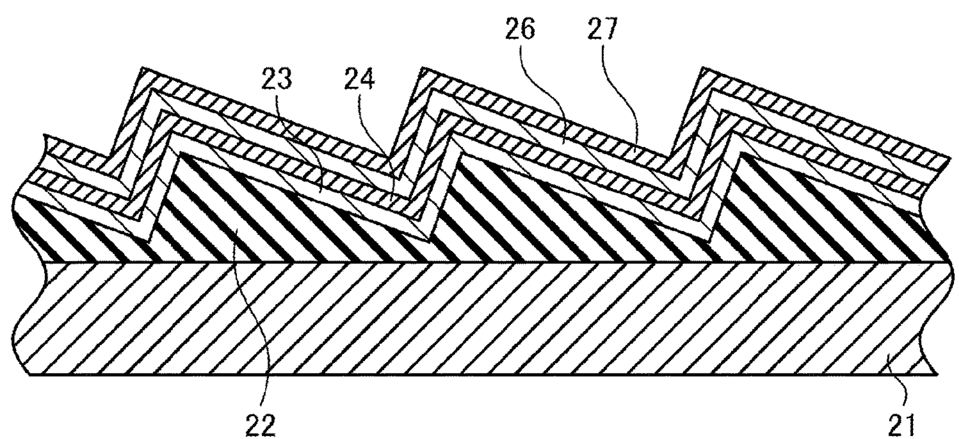
FIG. 5B is a cross-sectional view showing a step of the method for recycling the grating according to the fourth embodiment of the present disclosure.

FIGS. 5A and 5B are each a cross-sectional view showing a step of a method for recycling a grating according to a fourth embodiment of the present disclosure. In the fourth embodiment, in a case where the grating 14$c$ according to the first embodiment described with reference to FIG. 2 deteriorates into a decrease in diffraction efficiency, for example, it may be possible to recover the diffraction efficiency by recycling the grating.

FIG. 5A shows a to-be-recycled grating 14$f$. As with the grating 14$c$ described with reference to FIG. 2, the to-be-recycled grating 14$f$ may include a grating substrate 21, a groove forming member 22, a first aluminum metal film 23, and a first protective film 24.

FIG. 5B shows a recycled grating 14$g$. The recycled grating 14$g$ may further include a second aluminum metal film 26 newly formed by evaporation above the first protective film 24 and a second protective film 27 further formed by the ALD method above the second aluminum metal film 26. A step of forming the second aluminum metal film 26 may be preceded by a step of cleaning the surface of the first protective film 24.

The second protective film 27 may contain at least one of $MgF_2$, $SiO_2$, and $Al_2O_3$. The second protective film 27 may have such a film thickness as to be able to suppress oxygen permeation. For example, the film thickness of the second protective film 27 may be 1 nm or larger and 26 nm or smaller. Further, the second protective film 27 may have such a film thickness that causes a phase shift of $2\pi$ with a wavelength component selected by the grating. In a case where the grating selects a wavelength component of 193 nm, the film thickness of the second protective film 27 may for example be approximately 23 nm, albeit depending on the index of refraction of the second protective film 27.

The fourth embodiment may achieve making the recycled grating 14$g$ with a surface shape that is substantially the same as the surface shape of the to-be-recycled grating 14$f$. The fourth embodiment may also achieve a diffraction efficiency that is close to the diffraction efficiency of a grating without deterioration. Since the recycled grating 14$g$ can be made by reusing the to-be-recycled grating 14$f$, the cost of a grating can be made lower than in a case where a new grating is produced.

According to the fourth embodiment, the grating includes the second protective film 27 formed by the ALD method. Since the second protective film 27 is dense, oxygen permeation may be suppressed. Therefore, the oxidization of the second aluminum metal film 26 may be inhibited, and the decrease in diffraction efficiency of the grating may be suppressed, so that a long life of the recycled grating may be achieved.

In the case described here, the second protective film 27 is formed by the ALD method. However, the present disclosure is not limited to this. In the fourth embodiment, the second protective film 27 is not limited to the one formed by the ALD method, but may be formed by evaporation.

Further, in the case described here, the first protective film 24 is one formed by the same ALD method as that which is described with reference to FIG. 2. However, the present disclosure is not limited to this. In the fourth embodiment, the first protective film 24 is not limited to the one formed by the ALD method, but may be one formed by evaporation.

Further, in the case described here, the grating is recycled once. However, the present disclosure is not limited to this. In a case where the recycled grating 14$g$ including the second aluminum metal film 26 and the second protective film 27 deteriorates, a third aluminum metal film (not illustrated) may be newly formed by evaporation, and a third protective film (not illustrated) may be further formed above the third aluminum metal film. A step of forming the third aluminum metal film may be preceded by an additional step of cleaning the second protective film 27.

Further, recycling may be possible in a case where the grating according to the second or third embodiment deteriorates, as well as in the case where the grating according to the first embodiment deteriorates.

7. Recycling of Grating (Fifth Embodiment)

Figure 6A:
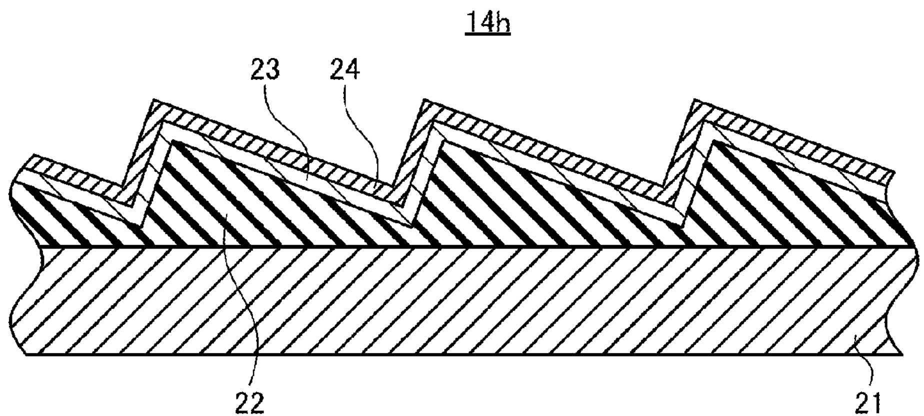
FIG. 6A is a cross-sectional view showing a step of a method for recycling a grating according to a fifth embodiment of the present disclosure.
Figure 6B:
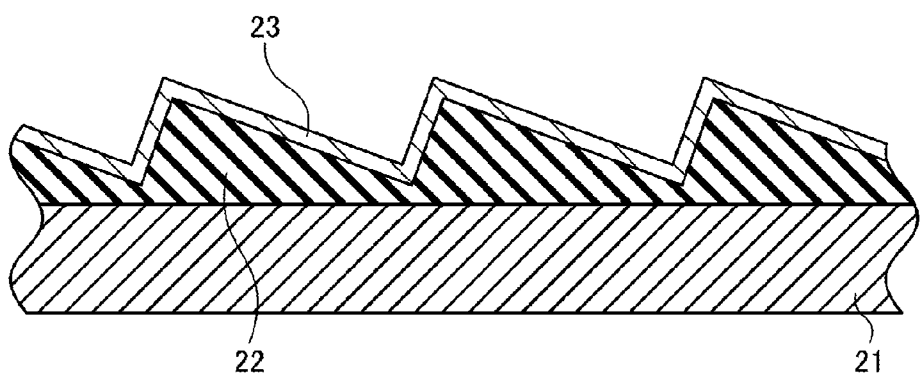
FIG. 6B is a cross-sectional view showing a step of the method for recycling the grating according to the fifth embodiment of the present disclosure.
Figure 6C:
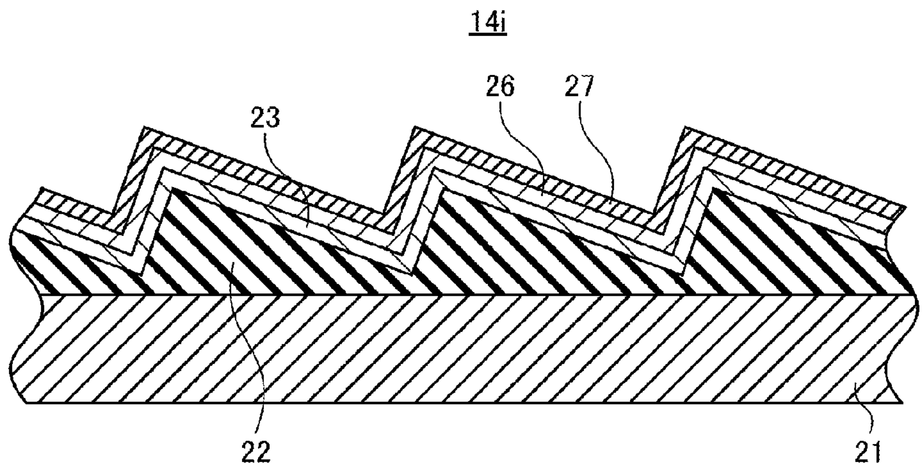
FIG. 6C is a cross-sectional view showing a step of the method for recycling the grating according to the fifth embodiment of the present disclosure.

FIGS. 6A to 6C are each a cross-sectional view showing a step of a method for recycling a grating according to a fifth embodiment of the present disclosure. The method for recycling a grating according to the fifth embodiment may differ from that according to the fourth embodiment in that the first protective film 24 is etched instead of being cleaned.

FIG. 6A shows a to-be-recycled grating 14$h$. As with the grating 14$c$ described with reference to FIG. 2, the to-be-recycled grating 14$h$ may include a grating substrate 21, a groove forming member 22, a first aluminum metal film 23, and a first protective film 24.

FIG. 6B shows a state where the first protective film 24 has been removed from the to-be-recycled grating 14$h$ by etching. The first protective film 24 may be etched, for example, by wet etching. Here, the first aluminum metal film 23 may function as an etching stopper. That is, by selecting an et chant with which the first protective film 24 is easily etched and the first aluminum metal film 23 is hardly etched, the etching can be terminated at the interface between the first protective film 24 and the first aluminum metal film 23.

FIG. 6C shows a recycled grating 14*i*. The recycled grating 14*i* may further include a second aluminum metal film 26 newly formed by evaporation above the first aluminum metal film 23 and a second protective film 27 further formed by the ALD method above the second aluminum metal film 26.

The fifth embodiment may achieve making the recycled grating 14*i* with a surface shape that is substantially the same as the surface shape of the to-be-recycled grating 14*h*. The fifth embodiment may also achieve a diffraction efficiency that is close to the diffraction efficiency of a grating without deterioration. Since the recycled grating 14*i* can be made by reusing the to-be-recycled grating 14*h*, the cost of a grating can be made lower than in a case where a new grating is produced.

According to the fifth embodiment, the grating includes the second protective film 27 formed by the ALD method. Since the second protective film 27 is dense, oxygen permeation may be suppressed. Therefore, the oxidization of the second aluminum metal film 26 may be inhibited, and the decrease in diffraction efficiency of the grating may be suppressed, so that a long life of the recycled grating may be achieved.

Further, another possible cause of the decrease in diffraction efficiency of the to-be-recycled grating 14*h* may be adhesion of dirt to the surface of the first protective film 24. By etching the first protective film 24, such dirt may be removed and therefore the diffraction efficiency may be recovered.

In the case described here, the second protective film 27 is formed by the ALD method. However, the present disclosure is not limited to this. In the fifth embodiment, the second protective film 27 is not limited to the one formed by the ALD method, but may be formed by evaporation.

Further, in the case described here, the first protective film 24 is one formed by the same ALD method as that which is described with reference to FIG. 2. However, the present disclosure is not limited to this. In the fifth embodiment, the first protective film 24 is not limited to the one formed by the ALD method, but may be one formed by evaporation.

Further, in the case described here, the grating is recycled once. However, the present disclosure is not limited to this. In a case where the recycled grating 14*i* including the second aluminum metal film 26 and the second protective film 27 deteriorates, the second protective film 27 may be removed, a third aluminum metal film (not illustrated) may be formed by evaporation, and a third protective film (not illustrated) may be further formed.

In other respect, the fifth embodiment may be identical to the fourth embodiment.

8. Grating Having No Replicated Groove Forming Member (Sixth Embodiment)

Figure 7:
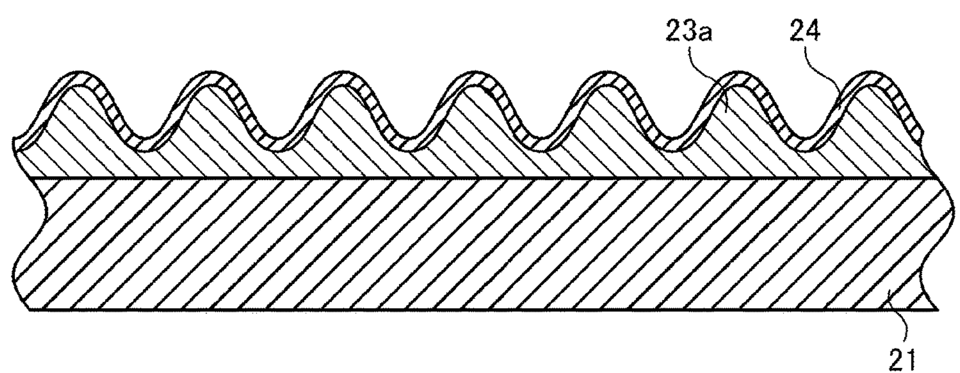
FIG. 7 is a cross-sectional view of a part of a grating according to a sixth embodiment of the present disclosure.

FIG. 7 is a cross-sectional view of a part of a grating according to a sixth embodiment of the present disclosure. A grating 14*j* according to the sixth embodiment may differ from those according to the first to fifth embodiments in that the grating 14*j* includes no groove forming member made of resin.

As shown in FIG. 7, the grating 14*j* according to the sixth embodiment may include, above a grating substrate 21 having a flat surface, a first aluminum metal film 23*a* having grooves in a surface thereof. The groove processing of the first aluminum metal film 23*a* may be performed by a lithographic process used in semiconductor manufacturing. The grating 14*j* according to the sixth embodiment may further include a first protective film 24 formed by the ALD method above the first aluminum metal film 23*a*.

The present disclosure is not limited to this. For example, the grating 14*j* according to the sixth embodiment may include, above a grating substrate having grooves in a surface thereof, a first aluminum metal film.

Further, the grooves are not limited to a case where they have the right-triangular cross-sections as described in the first to fifth embodiments, but may have sine-curved cross-sections as shown in FIG. 7.

The grating 14*j* according to the sixth embodiment includes no groove forming member made of resin. It may thus be unnecessary to keep down the processing temperature at which the first protective film 24 is formed by the ALD method. Therefore, a denser protective film 24 may be formed.

9. Other (Film Forming Apparatus Performing ALD Method)

Figure 8:
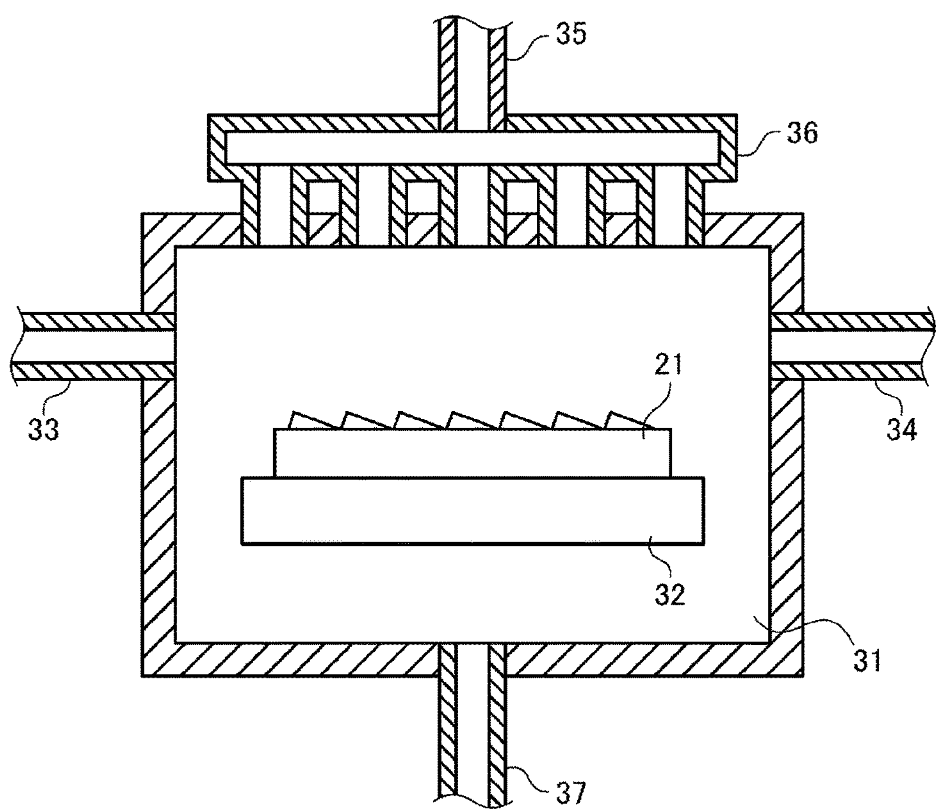
FIG. 8 is a cross-sectional view showing an example of a film forming apparatus performing ALD method that may be used in each of the embodiments described above.

FIG. 8 is a cross-sectional view showing an example of a film forming apparatus performing the ALD method that may be used in each of the embodiments described above. A film forming apparatus 30 performing the ALD method may include a film forming vessel 31, a heating plate 32, a raw material gas supply port 33, a raw material gas exhaust port 34, an oxidant supply port 35, and an excess oxidant and byproduct exhaust port 37.

The film forming vessel 31 may house the heating plate 32. The heating plate 32 may fix the grating substrate 21 in the film forming vessel 31 and be capable of heating the grating substrate 21.

The raw material gas supply port 33 and the raw material gas exhaust port 34 may be connected to the film forming vessel 31. The raw material gas supply port 33 may supply a gaseous raw material compound for the ALD method into the film forming vessel 31. The gaseous raw material compound may thus be adsorbed onto the surface of the grating. The raw material gas exhaust port 34 may exhaust the gaseous raw material compound that was not adsorbed onto the surface of the grating. The raw material compound may for example be tetraethoxysilane or trimethylaluminum as described above.

The oxidant supply port 35 may be connected to the film forming vessel 31 via a manifold 36. The oxidant supply port 35 may supply, for example, an oxygen gas into the film forming vessel 31 via the manifold 36.

The excess oxidant and byproduct exhaust port 37 may exhaust both the oxygen gas that did not react with the raw material compound on the grating surface and a byproduct.

With this configuration, first, the grating substrate 21 may be placed into the film forming vessel 31 and be heated to a predetermined processing temperature by the heating plate 32.

(A) Next, the gaseous raw material compound for the ALD method may be supplied into the film forming vessel 31 by the raw material gas supply port 33. This may cause the raw material compound to be adsorbed onto the grating substrate 21.

(B) Then, the gaseous raw material compound that was not adsorbed onto the surface of the grating may be exhausted out of the film forming vessel 31 by the raw material gas exhaust port 34.

(C) Then, the oxygen gas may be supplied into the film forming vessel 31 via the manifold 36 by the oxidant supply port 35. This may cause a reaction between the raw material compound adsorbed onto the grating substrate 21 and the oxygen gas supplied into the film forming vessel 31.

(D) Then, the excess oxidant and the byproduct may be exhausted out of the film forming vessel 31 by the byproduct exhaust port 37.

(E) By repeating a cycle of the steps (A) to (D), one layer of protective film may be formed per cycle, and film formation may be performed until the desired film thickness is achieved.

In a case where the grating includes a groove forming member made of resin as described in the first to fifth embodiments, it is desirable to keep down the processing temperature of the ALD method. In that case, plasma may be generated in the film forming vessel 31 to accelerate the reaction of the ALD method. An antenna (not illustrated) for generating plasma may be provided between the grating substrate 21 and the manifold 36.

The aforementioned descriptions are intended to be taken only as examples, and are not to be seen as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

The invention claimed is:

1. A method for recycling a grating for line-narrowing a laser beam that is outputted from a laser apparatus at a wavelength in a vacuum ultraviolet region, the grating including a grating substrate, a first aluminum metal film formed above the grating substrate, the first aluminum metal film having grooves in a surface thereof, and a first protective film formed above the first aluminum metal film, the method comprising:

etching at least a part of the first protective film;

forming a second aluminum metal film above the first aluminum metal film; and forming a second protective film above the second aluminum metal film.

2. The method according to claim 1, wherein the grating further includes a groove forming member formed between the grating substrate and the first aluminum metal film.

3. The method according to claim 1, wherein the first protective film contains at least one of $MgF_2$, $SiO_2$, and $Al_2O_3$.

4. The method according to claim 1, wherein the second protective film contains at least one of $MgF_2$, $SiO_2$, and $Al_2O_3$.

5. The method according to claim 1, wherein the second protective film has a film thickness of 1 nm or larger and 26 nm or smaller.

6. The method according to claim 1, wherein the second protective film is formed by an ALD method.

* * * * *